United States Patent Office 3,134,570
Patented May 26, 1964

3,134,570
DIAPHRAGM VALVE
Charles Roy Jarrett, Cwmbran, England, assignor to Saunders Valve Company Limited, Cwmbran, England, a British company
Filed May 16, 1960, Ser. No. 29,516
1 Claim. (Cl. 251—331)

This invention relates to valves for the control of fluids in which a flexible diaphragm which flexes between the open and closed positions of the valve is interposed between the operating mechanism and the controlled fluid. The diaphragm eliminates the necessity for a stuffing box with its high friction and the difficulty of making it fluid tight and also isolates the mechanism from the controlled fluid thus making it possible to control corrosive and other difficult fluids without the need for making the mechanism of other than common metals.

Valves of this character in which the diaphragm itself is also the closure member, that is to say, in which the diaphragm as such cooperates with a seating in the valve casing, are well known and typical examples will be found in numerous specifications in the name of the Saunders Valve Company Limited and its predecessors.

An object of the present invention is to provide a valve which is better suited than prior valves to deal with high fluid pressures. By high pressures is meant a pressure substantially higher, say up to 3 times, than the pressure which a weir type valve of the same bore can satisfactorily deal with. By difficult fluids is meant fluids for which the necessary composition of the diaphragm and closure member makes it difficult to provide sufficient flexibility to accommodate the deflection of the diaphragm called for by the weir type diaphragm valve or straight through diaphragm valve above described.

The present valve has the operating mechanism isolated from the controlled fluid by a flexible diaphragm which is clamped fluid tight over a margin of circular inner boundary, which flexes between the open and closed positions of the valve and which has integral with it a portion forming the actual valve closure and cooperating with an annular seating in the valve casing concentric with the inner boundary of the clamped margin. To ensure that the diaphragm is not subjected to stresses which are excessive if the fluid pressure is high, or subjected to strains which render it more vulnerable to chemical attack, it is moulded corresponding to the closed position and it is shaped so that in the closed position of the valve it sweeps in a continuous rounded curve from the neighbourhood of the inner boundary of the clamped margin into a tubular centre part having a closed end which constitutes the actual valve closure, while the valve casing includes a supporting surface extending inwardly from the clamped margin of the diaphragm and the operating mechanism includes a supporting member which extends within the tubular part of the diaphragm from the actual closure and substantially out to the edge of the supporting surface, the supporting surface and the supporting member being so shaped that in all positions of the valve the diaphragm is supported behind the greater part of its area exposed to the fluid pressure.

In all positions there will be an unsupported annulus of the diaphragm but by suitable shaping of the supporting surface and supporting member, this unsupported annulus will be narrow, and though as the valve closes it will tend to widen towards the margin, any stresses will be kept low even if the valve is mounted so that when closed the pressure acts outside the seating i.e. on the diaphragm outside the centre part. It is preferable however to mount the valve so that the pressure acts only on the centre part when the valve is closed, in which case the diaphragm does not then come under fluid pressure. In the closed position, the supporting member supports the diaphragm up to the full diameter of the supporting member. In opening the valve, due to the axial forces, in this region the material will be stressed and the stresses will continue round the swept part of the diaphragm. However the opening of the valve also deflects this swept zone of the diaphragm so that it bears firmly against the supporting surface and tends to present a corrugation away from the valve seating into the space left by the supporting member towards the full diameter of the latter. The supporting surface is suitably a flat annulus which may be on a flange formed integrally with the usual bonnet, or for convenience in production and assembly on a separate washer seated in the bonnet.

One advantage of keeping stresses near the margin of the diaphragm at a low value is that it makes a good seal round the margin of the diaphragm easier to attain and it becomes less necessary to provide the diaphragm with a fish-tail or similar sectioned margin, though a sealing rib on the diaphragm may be desirable.

A further advantage of reducing stresses to a low value is that it becomes unnecessary to embed fabric reinforcement in the diaphragm. This simplifies its manufacture and lessens the risk of chemical attack as well as permitting adequate local elastic deformation without risk of rupturing an embedded fabric reinforcement.

With the diaphragm formed in accordance with the invention, a fairly substantial force has to be transmitted through the operating mechanism to the diaphragm structure in the neighbourhood of the actual closure. This is conveniently effected by moulding a metal insert in the centre of the diaphragm, this insert having a projecting threaded portion or a threaded socket for connection with the operating mechanism. In a small valve the metal insert may extend into the tubular part and form in effect part of the supporting member.

The seating with which the closure cooperates is preferably of coned form and the closure is shaped so that on first contact, either line contact or very narrow surface contact is obtained, thus making it easy to get a tight closure against high pressure using a comparatively low force.

The diaphragm is made of a hard but flexible and compressible material having a relatively low compression set. For example, a nitrile rubber compound with a British Standard hardness of 90° to 95° is suitable. The tubular part and swept zone of the diaphragm are preferably of the same hardness and since they are moulded in an integral piece with the closure, it is easier to make the whole structure of the same hardness throughout than to graduate it. Further, the whole diaphragm can be made relatively thick and strong without making it difficult to operate the valve.

While the shape of the passage through the valve body is not so advantageous as some other known forms of diaphragm valve from the point of view of flow resistance, this is more than outweighed by the practical advantages of the possibility of controlling high pressures and difficult fluids, in which cases flow resistance is usually of minor significance.

The invention will be further described with reference to the accompanying drawings in which examples are illustrated.

Figures 1, 2:
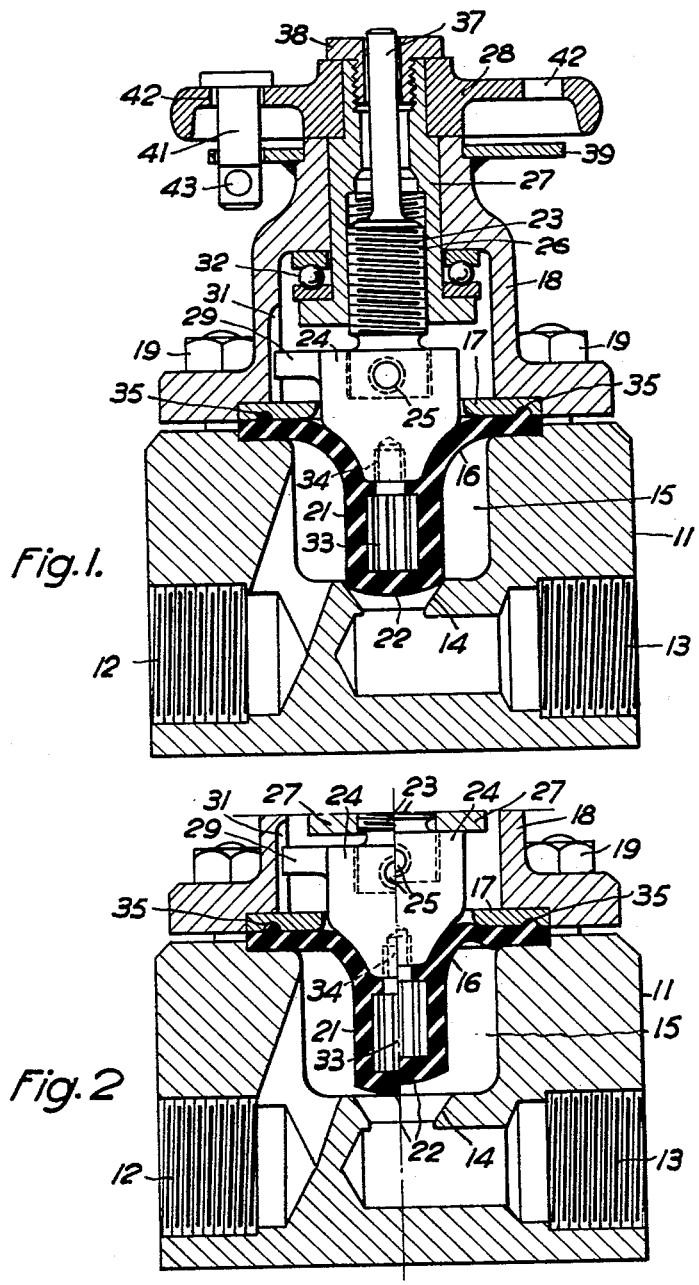
FIGURE 1 is an axial section of a first embodiment showing the valve closed.
FIGURE 2 is an axial section of this embodiment, the right hand side showing the valve fully open, and the left hand side showing the valve partly open.

Referring now to FIGURE 1 a valve casing 11 has a passage through it terminating in end connections 12, 13 here exemplified by threaded sockets for connection in a pipe line though any other well known connecting means such as flanges may be used according to size and service envisaged. Between the connections 12, 13 the passage is encompassed by an annular seating 14 here shown of coned form.

An opening 15 extends from the passage through the casing 11 and terminates in an annular clamping surface on which the margin of a diaphragm 16 of circular outline is clamped by the margin of a washer 17 seated in a recess in a bonnet 18 and any convenient clamping means here exemplified by studs and nuts 19.

The diaphragm which is hard but flexible and compressible and does not contain any embedded fabric reinforcement, sweeps in a continuous rounded curve from just within the clamped margin into a tubular centre part 21 which is closed by a substantially solid end 22 which cooperates with the seating 14 and thus forms the actual valve closure. The end 22 is here shown with a sharp edge but under full closing pressure, being of flexible material it will be deformed into narrow surface contact with the seating 14.

To open and close the valve a spindle 23 and a supporting member 24 fast to it are provided. These two parts could be integral but for manufacturing convenience may be made separately and secured together by any suitable means here exemplified by a cross pin 25.

The spindle 23 may be moved axially to open and close the valve by any well known manual or power means, here exemplified by a screw thread 26 cooperating with a nut 27 axially restrained but rotatable in the bonnet 18 and having a hand wheel 28 keyed to it. To prevent the spindle from rotating when the nut is rotated, a lug 29 is provided on the member 24 engaging a keyway 31 in the bonnet 18. To reduce the forces, a ball thrust bearing 32 may be provided between the nut 27 and bonnet 18.

Since the swept part of the diaphragm is of thick material and the diaphragm incorporates the axial tubular part 21, a substantial axial force must be applied at its centre to open the valve. This is effected by the aid of a metal member moulded into the centre of the diaphragm and having a threaded connection with the operating mechanism. Here the metal member is a screw with a long head 33 and a threaded shank 34 which projects and screws into a tapped hole in the member 24. The head extends into the tubular part and in effect constitutes an extension of the supporting member 24. There may be holes through the head through which the moulded material extends to improve the anchoring. The opening movement is here limited by the upper end of the member 24 abutting the lower end of the nut 27 when the valve is fully opened, see the right hand side of FIGURE 2.

The diaphragm is moulded in a shape corresponding to the closed position of the valve, that is substantially of the shape shown in FIGURE 1 with allowance for the clamping of the margin and some axial compression of the centre part 22. These allowances are small however since as above mentioned the diaphragm is moulded in a relatively hard material. Also the supporting member 24 is so shaped on its underside that with the valve closed and with the parts free of fluid pressure, up to its full diameter it substantially fits the back of the diaphragm 16. Also its full diameter is such as to have only a reasonable working clearance within the washer 17. When there is no fluid pressure on the diaphragm there is some clearance between it and the other part of the washer. If the valve is connected, as preferred, so that the upstream pressure is on the inside of the seating, this clearance will remain and will not matter when the valve is closed. If the valve is connected the other way, when it is closed the fluid pressure will deflect or tend to deflect the diaphragm into contact with the washer 17 but only a slight deflection and therefore slight stress will occur.

As the valve is opened the upward pull resisted by the tendency of the diaphragm to retain its form causes stresses to appear in the tubular part 21, which carry round into the swept part. Since the diaphragm is of flexible material there will be some amount of radial compression of the part 21 against the head 33 while there will be slight axial compression just above the head 33 and the swept portion will tend near its junction with the tubular portion 21 to remain in contact with the member 24 while just inside the clamped margin the diaphragm will at first flatten against the washer 17 as on the right hand side of FIGURE 2. As the valve continues to open the diaphragm will form an upward corrugation into the space left by the member 24, as shown on the right hand side of FIGURE 2. To avoid any risk of the diaphragm being damaged by the edge of a washer 17 the latter is rounded as shown.

These deflections impose somewhat complicated stresses in the material of the diaphragm but these stresses are nowhere very high and do not include any substantial radial tensile component. When the valve is open the pressure of the controlled fluid is applied to the whole undersurface of the diaphragm and this tends to force the diaphragm upwards.

Over the centre part 22 and the tubular part 21 the pressure will be taken against the head 33 and in the immediately adjacent swept part the pressure will be taken by the member 24 while against the clamped margin the diaphragm will be supported by the washer 17. Only the unsupported annular region will be put under a little tension which will be carried radially into the clamped margin. To assist in resisting this radial tension the margin of the diaphragm may have a rib 35 which is received into a groove in the clamping surface of the washer 17. If the groove is of slightly smaller cross section than the rib when free, the rib will also improve the fluid tight sealing of the diaphragm to the casing of the valve.

Figure 3:
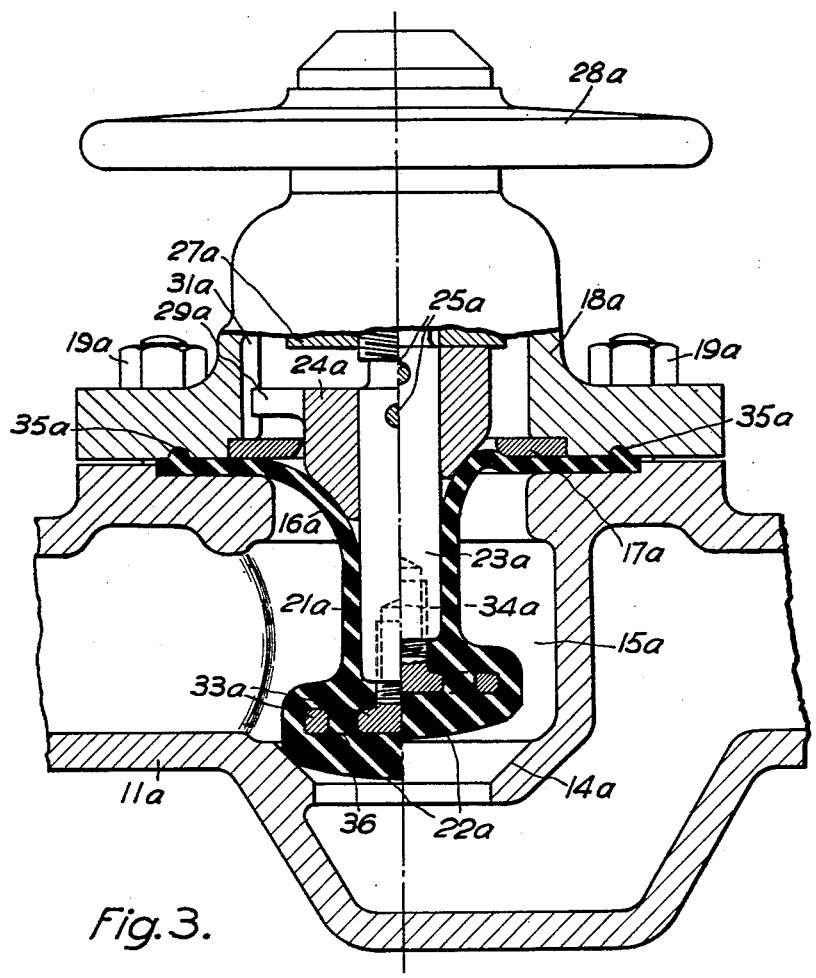
FIGURE 3 is an axial section of a second embodiment, the left hand side showing the valve closed, and the right hand side showing the valve open.

The valve shown in FIGURE 3 in many ways resembles that shown in FIGURES 1 and 2 and the corresponding parts have the same reference numerals with the suffix *a* and except in certain details do not therefore need to be described. Also, as the mechanism is the same as in the former example, it is not shown in FIGURE 3. The construction shown in FIGURE 3 is intended for valves of larger bore than that shown in FIGURES 1 and 2. For this reason it is possible to make the tubular part 21*a* of relatively smaller diameter. This in turn makes it more convenient to extend the spindle 23*a* downwardly inside the supporting member 24*a* and into the tubular part to form a support therein. In view of the relatively large diameter of the closed end 22*a* the head of the screw is now in the form of a flange 33*a* of relatively large diameter, preferably provided with holes 36 through which the material of the diaphragm extends thus more firmly anchoring the screw.

There are also certain other differences between the construction of FIGURES 1 and 2 and that of FIGURE 3. These differences arise from indirect considerations. Thus the construction shown in FIGURES 1 and 2 is appropriate to valves with smaller bores than that of FIGURE 3 and in consequence has parts assumed to be made by machining solid material so that the ports and passageways are made by drilling and the casing has a simple outline. The construction shown in FIGURE 3 has details which are appropriate to a valve made of cast parts for the casing 11*a*, bonnet 18*a* and member 24*a*. Both constructions are shown with an inlet and outlet in line but could equally well be made as an angle valve whether made of castings or from the solid. Again FIGURES 1 and 2 show threaded socket end connections while FIGURE 3 does not show the end connections at all. Obviously if required any other well known form of end connections could be used, such as threaded male end connections or flange connections.

FIGURES 1 and 2 show some further features. Thus an upward extension 37 is shown on the spindle 23 the upper end of which is substantially flush with a hand wheel retaining member 38 when the valve is closed. This upward extension 37 serves as an indicator of the amount that the valve is open and similar provision can be made in FIGURE 3. Again in FIGURES 1 and 2 the bonnet 18 has a fixed flange 39 with an aperture through which can be passed a pin 41 also passing through one of a series of apertures 42 in the hand wheel 28. This pin has a hole 43 for a padlock enabling the valve to be locked in the closed or any adjusted open position. Similar locking provisions can be provided in FIGURE 3. Further these provisions and the indicator member 37 can be omitted in the constructions shown in FIGURES 1 and 2. In FIGURES 1 and 2 the closed end 22 has a mere edge to coact with the seating 14. A narrow bevel can be provided here if desired as in FIGURE 3 and equally a mere edge can be provided in FIGURE 3. With a mere edge or narrow bevel it is made easy to get a tight closure against high pressure using a comparatively low force.

It should be mentioned that the diaphragm structure of the present valve has sufficient inherent strength to enable it to be used under a vacuum, as well as for high pressures or difficult fluids.

I claim:

A valve for the control of fluids comprising a valve casing, two connections on the casing, the casing enclosing a passage therethrough leading from one end connection to the other, an annular seating encompassing the passage between the end connections, an annular clamping surface on the casing concentric with and spaced from the seating having its inner boundary of substantially larger diameter than the seating, said passage including an opening extending from the seating to the inner boundary of the clamping surface, a diaphragm sealingly clamped round its margin on the clamping surface, operating mechanism carried outside the diaphragm, and thereby isolated from fluid in the passage, the diaphragm including an integral tubular centre part having a closed end, the diaphragm being moulded corresponding to the closed position of the valve and shaped so that in the closed position of the valve a portion of substantially constant thickness sweeps smoothly in a continuous rounded curve from adjacent the inner boundary of its clamped margin into the tubular centre part with the closed end then bearing under axial pressure of the operating mechanism against the seating and constituting the actual valve closure, an annular continuous supporting surface on the valve casing extending inwardly from the clamped margin of the diaphragm on the support surface thereof, and a supporting member extending within and throughout the entire length of the tubular centre part from the actual closure and continuing substantially out to the edge of the supporting surface, the contour of the supporting member being shaped so that in the closed position it is in continuous contact with substantially the entire portion of the diaphragm within which it extends, said supporting member being part of the operating mechanism and being secured to the diaphragm to enable the operating mechanism to pull the diaphragm positively from the closed to the open position, said supporting surface being so shaped that the swept portion of the diaphragm can roll between the closed and open positions and is supported in all positions of the valve jointly by said surface and said support member behind the greater part of its area exposed to the fluid pressure.

References Cited in the file of this patent

UNITED STATES PATENTS

| | | |
|---|---|---|
| 393,536 | Brudin | Nov. 27, 1888 |
| 1,647,823 | Antisell | Nov. 1, 1927 |
| 1,806,305 | Mueller | May 19, 1931 |
| 2,216,292 | Evleth | Oct. 1, 1940 |
| 2,381,544 | Jacobsen | Aug. 7, 1945 |
| 2,605,991 | Kaye | Aug. 5, 1952 |
| 2,840,339 | Price | June 24, 1958 |

FOREIGN PATENTS

| | | |
|---|---|---|
| 902,924 | Germany | Jan. 28, 1954 |
| 528,540 | Canada | July 31, 1956 |
| 1,014,806 | Germany | Aug. 29, 1957 |
| 1,207,719 | France | Sept. 7, 1959 |
| 1,211,043 | France | Oct. 5, 1959 |
| 1,211,752 | France | Oct. 12, 1959 |
| 655,576 | Great Britain | July 25, 1951 |